(12) United States Patent
Joseph et al.

(10) Patent No.: US 10,618,424 B2
(45) Date of Patent: Apr. 14, 2020

(54) WYE-DELTA EDRIVE SYSTEM FOR ELECTRIC VEHICLES

(71) Applicant: Ford Global Technologies, LLC, Dearborn, MI (US)

(72) Inventors: Matthew Joseph, St. Clair Shores, MI (US); Prasad Venkiteswaran, Pittsburgh, PA (US); Shehan Haputhanthri, Canton, MI (US); Jacob Krizan, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 19 days.

(21) Appl. No.: 16/054,523

(22) Filed: Aug. 3, 2018

(65) Prior Publication Data

US 2020/0039364 A1 Feb. 6, 2020

(51) Int. Cl.
| | |
|---|---|
| *H02P 1/00* | (2006.01) |
| *H02P 3/00* | (2006.01) |
| *H02P 5/00* | (2016.01) |
| *B60L 15/20* | (2006.01) |
| *H02P 25/18* | (2006.01) |
| *H02K 11/21* | (2016.01) |
| *B60L 50/51* | (2019.01) |

(52) U.S. Cl.
CPC ........... *B60L 15/2045* (2013.01); *B60L 50/51* (2019.02); *H02K 11/21* (2016.01); *H02P 25/184* (2013.01); *B60L 2240/421* (2013.01); *B60L 2240/423* (2013.01)

(58) Field of Classification Search
CPC ............................ B60L 15/2045; H02K 11/21

USPC ........................................................ 318/139
See application file for complete search history.

(56) References Cited

U.S. PATENT DOCUMENTS

| | | | |
|---|---|---|---|
| 4,761,602 A * | 8/1988 | Leibovich | H02K 17/16 |
| | | | 310/180 |
| 5,675,222 A | 10/1997 | Fliege | |
| 8,183,814 B2 * | 5/2012 | Fuchs | H02P 1/38 |
| | | | 318/524 |
| 8,207,699 B2 * | 6/2012 | Naiman | H02P 27/04 |
| | | | 310/159 |
| 9,260,024 B1 | 2/2016 | Lau | |
| 9,266,438 B2 | 2/2016 | Power et al. | |
| 2013/0175954 A1 * | 7/2013 | Astigarraga | H02P 1/04 |
| | | | 318/376 |
| 2014/0089064 A1 | 3/2014 | Hyde et al. | |
| 2014/0335995 A1 * | 11/2014 | Swales | B60W 20/00 |
| | | | 477/3 |

(Continued)

FOREIGN PATENT DOCUMENTS

| | | |
|---|---|---|
| WO | 2009070089 A1 | 6/2009 |
| WO | 2017174957 A2 | 10/2017 |

*Primary Examiner* — Erick D Glass
(74) *Attorney, Agent, or Firm* — Brooks Kushman PC; David Kelley

(57) ABSTRACT

A vehicle includes an electric machine having independently selectable delta and wye windings. The electric machine has a lower torque producing limit with one of the windings than an other of the windings at a given speed. The vehicle includes a controller configured to select the other of the windings such that torque of the electric machine increases without increasing the given speed. The selection is responsive to operating with the one of the windings and a torque demand greater than the lower torque producing limit.

1 Claim, 5 Drawing Sheets

(56) References Cited

U.S. PATENT DOCUMENTS

2017/0133960 A1* 5/2017 Takahashi ................. H02P 6/10
2017/0133968 A1* 5/2017 Takahashi ............. H02P 25/184

* cited by examiner

WYE-DELTA EDRIVE SYSTEM FOR ELECTRIC VEHICLES

TECHNICAL FIELD

The present invention relates to Wye-Delta eDrive systems for electric vehicles.

BACKGROUND

Electric machines are used to propel and brake vehicles. The electric machines may be wound with independent Wye and Delta windings. The torque of the electric machine is dependent on the operating speed of the electric machine and the winding being used. The higher torque producing winding may impose unnecessary losses during constant speeds (e.g., during speed or cruise control). As such, the electric machine controller may switch to the lower torque producing winding to save energy, rendering higher torque unavailable.

SUMMARY

A vehicle includes an electric machine having independently selectable delta and wye windings. The electric machine has a lower torque producing limit with one of the windings than an other of the windings at a given speed. The vehicle includes a controller configured to select the other of the windings such that torque of the electric machine increases without increasing the given speed. The selection is responsive to operating with the one of the windings and a torque demand greater than the lower torque producing limit.

A method, by a controller, includes selecting a winding of an electric machine having independently selectable delta and wye windings such that torque of the electric machine increases without increasing a given speed, the electric machine having a lower torque producing limit with one of the windings than the other of the windings at a given speed. The selection is responsive to a torque demand greater than the lower torque producing limit.

A vehicle includes a plurality of electric machines having delta and wye windings being independently selectable, for operation at a given speed with a one of the windings having a lower torque and a higher efficiency with respect to an other of the windings at the speed, by a controller configured to select the other of the windings such that torque of the electric machine at the given speed is increased. The selection being responsive to a request to increase torque on one of the plurality.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Electric vehicles operating with a lower torque producing winding—in order to avoid unnecessary efficiency losses associated with a higher torque producing winding because of harmonics—may be used when the speed of the electric machine is constant for a period. The lower torque producing winding, however, may provide inadequate torque performance during events. If the requested torque is higher than the torque available from the lower torque producing winding, the controller may switch to the higher torque producing winding in response to requests derived from various circumstances. The switch may be before the higher torque is requested or on demand. Indeed, low torque availability due to efficiency expectations can be overcome through recognition of events requiring higher torque.

Figure 1:
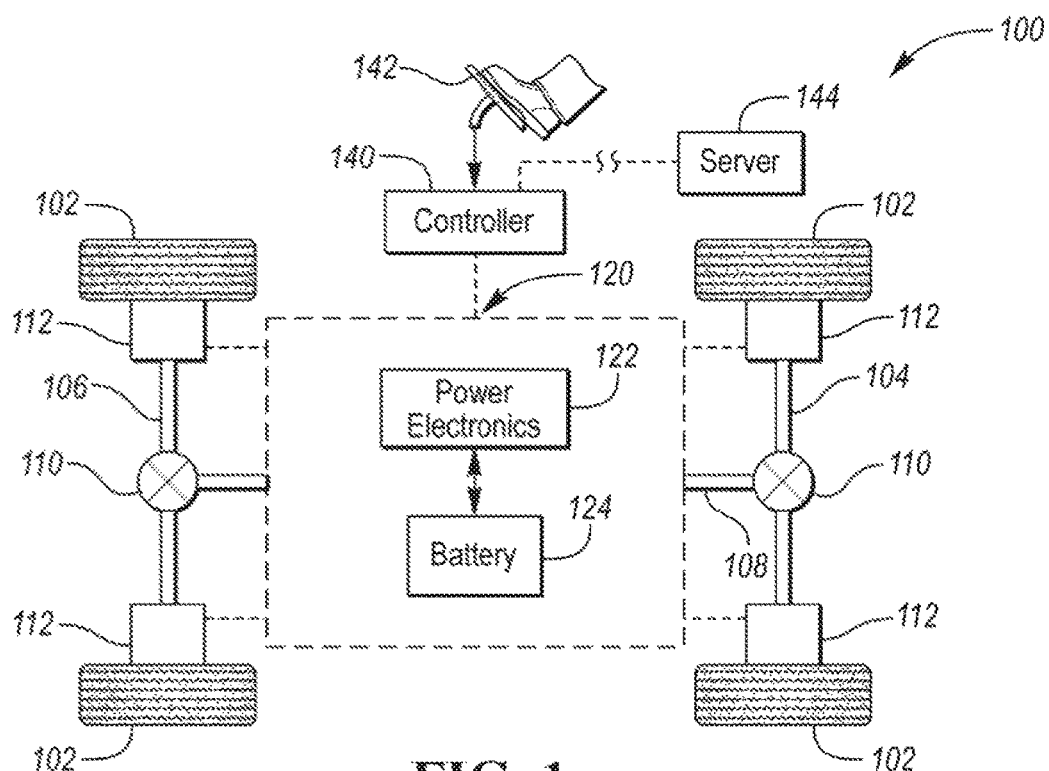
FIG. 1 is a schematic of a vehicle.

Referring to FIG. 1, a vehicle 100 is shown. The vehicle 100 includes a set of wheels 102. The wheels 102 may be on a front axle 104 or a rear axle 106 connected to chassis 108. The axles 104, 106 may include a differential 110. Each of the axles 104, 106 or wheels 102, individually, may be associated with one of a plurality of electric machines 112. That is, the electric machines 112 may be direct-drive and associated with each wheel 102 or the vehicle 100 may have two electric machines 112 associated with each axle 104, 106. Further, the vehicle may have one electric machine 112 configured to power one or more of the wheels 102 via a common drivetrain. Thus, any number of electric machines 112 and configurations thereof are contemplated in this disclosure and will be referred to collectively as an electric machine 112 or a plurality of electric machines throughout this disclosure.

Figure 2:
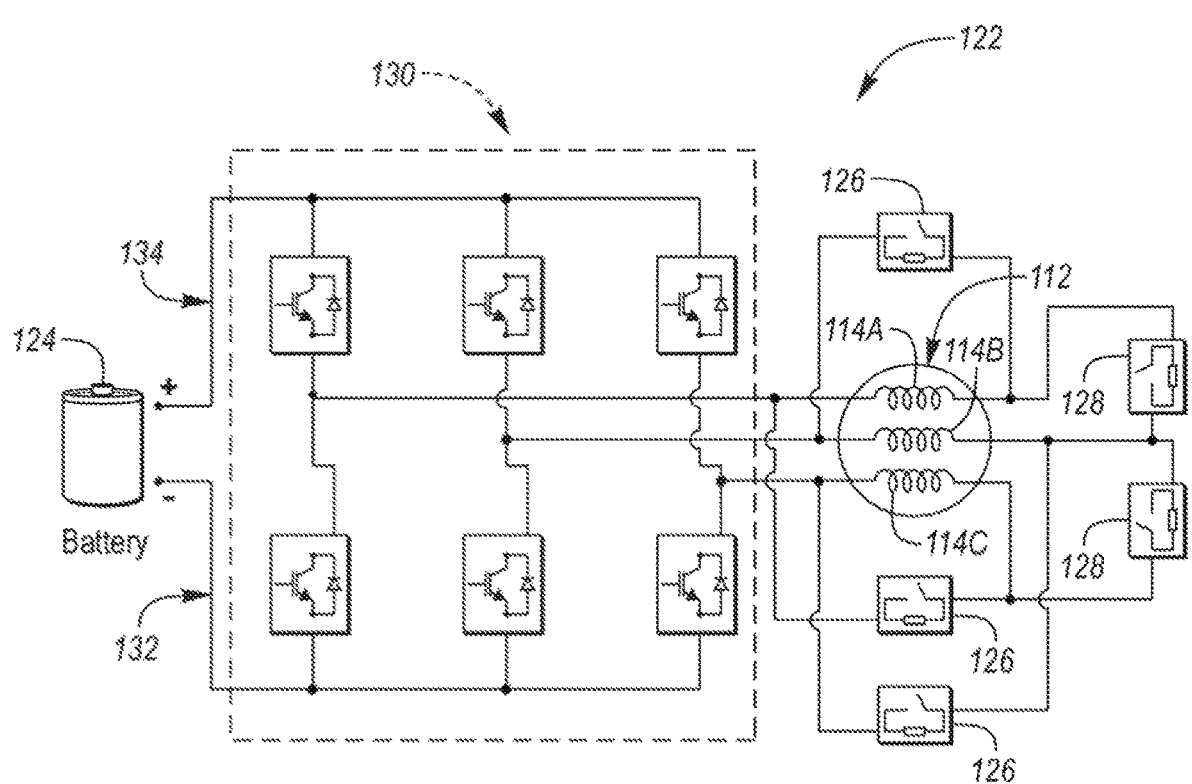
FIG. 2 is a schematic of a power electronics system.

The electric machine 112 is operated by power electronics 122, as discussed in FIG. 2. The power electronics 122 are energized by a battery 124. The power electronics may be directed or controlled by a controller 140. The controller 140 may include gate drivers or other hardware to drive switches of the power electronics along with processors, memory, and communications to perform logic functions and exchange information. The controller 140 may include one or more processors and controllers working to perform such functions. The controller 140 may further include various types of computing apparatus in support of performance of the functions of the controller 140 described herein. In an example, the controller 140 may include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, a processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, Java, C, C++, C #, Fortran, Pascal, Visual Basic, Python, Java Script, Perl, PL/SQL, etc. The controller 140 may also communicate with a server 144 that is offboard the vehicle 100 to retrieve autonomous vehicle commands or other information regarding transit of the vehicle 100. The controller 140 may further receive a control signal of a pedal 142 from operators of the vehicle 100 or similar autonomous commands. The controller 140 may also determine autonomous commands and otherwise drive the vehicle 100 autonomously. The server 144 may include processors and data storage to provide information to the vehicle 100.

Referring to FIG. 2, a power electronics system 122 is shown operating an electric machine 112. A battery 124 is used to energize or draw energy from the power electronics 122. The power electronics 122 include a set of inverter switches 130 configured to generate an alternating signal from the battery 124. The battery 124 energizes rails 132, 134 of the power electronics 122. As shown, the inverter switches 130 energize the windings 114A, 114B, 114C corresponding to the associated phases of the electric machine 112. As shown, the windings 114A, 114B, 114C may be selected or configured in Delta or Wye. The windings 114A, 114B, 114C are associated with Delta switches 126 that configure the windings as Delta when closed. The windings 114A, 114B, 114C are associated with Wye switches 128 that configure the windings 114A, 114B, 114C as Wye when closed. Other winding 114A, 114B, 114C configurations may be used. That is, additional sets of switches 130 may be used to alternately power an additional set of windings such that the switches 126, 128 as shown are not necessary. Meaning, the electric machine 112 may be double wound with independent Wye and Delta windings, or the electric machine 112 may also be wound with independent Wye and Delta switches 126, 128 to selectively create Wye and Delta windings, or some combination thereof. Any configuration, combination, addition, or subtraction of inverter switches 130, electric machines 112, and windings 114A, 114B, 114C known and unknown is contemplated by this disclosure.

Figure 3:
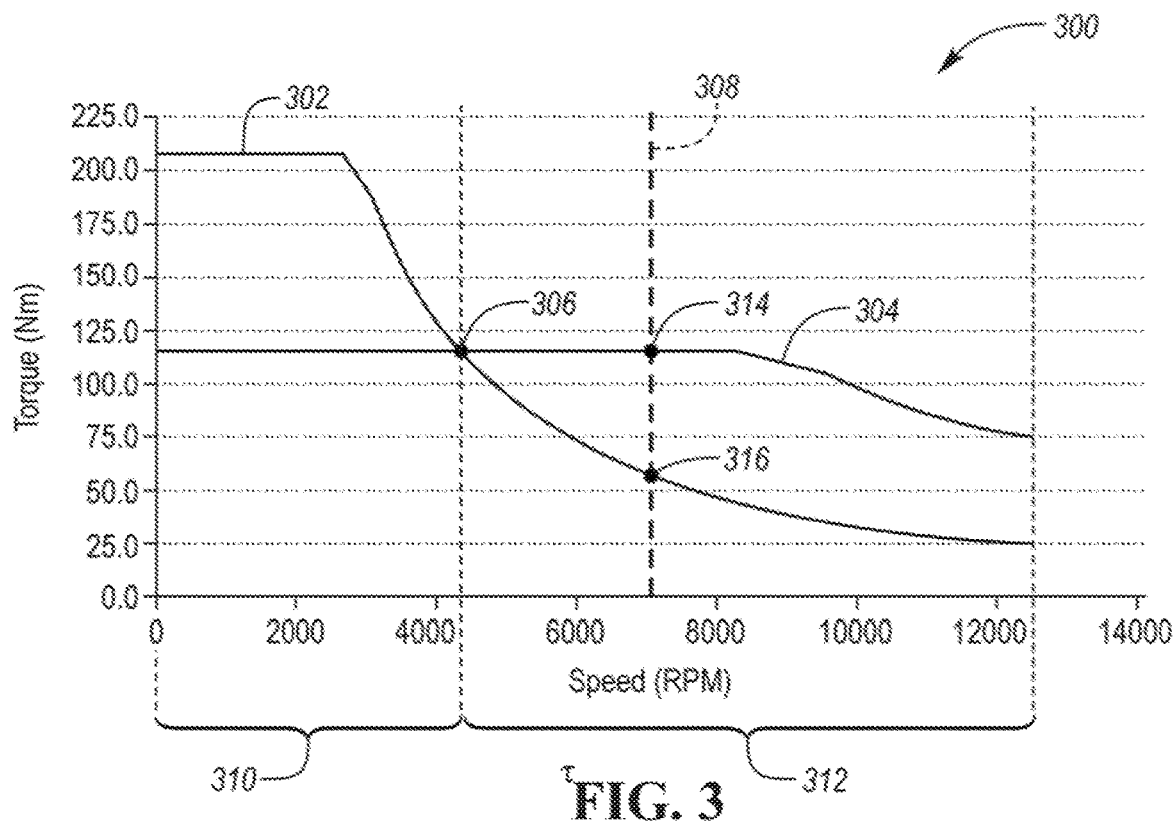
FIG. 3 is a graph comparing torque and speed of Delta and Wye windings operating an electric machine.

Referring to FIG. 3, a graph 300 is shown. The graph 300 depicts a relationship between speed and torque for the electric machine 112. The Wye winding curve 302 indicates high torque at low speeds and depreciating torque at high speeds. The Delta winding curve 304 indicates a more constant torque across all speeds that tapers at high speeds. As shown, for a first range of speeds 310 the Delta windings 304 produce less torque than the Wye windings 302, and for a second range of speeds 312 greater than the first range of speeds 310, the Wye windings 302 produce less torque than the delta windings 304. The vehicle 100 may be configured autonomously or by an operator to maintain a constant speed 308. That is, during highway transit, the vehicle 100 may operate at constant speed 308 to reduce losses associated with acceleration and deceleration. At this given speed 308, the harmonics associated with the higher torque producing winding, the Delta winding 304, may impose reduced efficiency of the electric machine 112 although it has a higher torque producing limit 314. Thus, the controller 140 may configure the electric machine 112 to operate with a lower torque producing limit 316 with the Wye winding 302.

Figure 4:
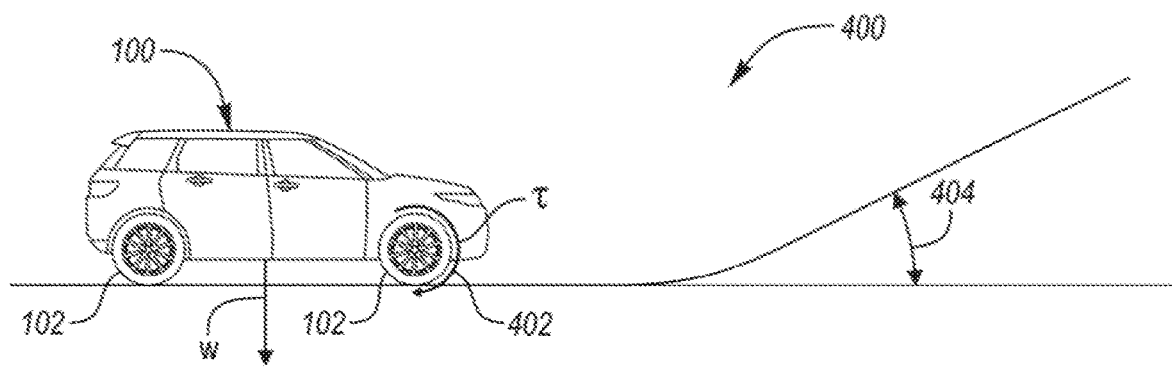
FIG. 4 depicts a vehicle traversing a grade.

Referring to FIG. 4, a hill-climb situation 400 is depicted. The vehicle 100 is shown traversing a road 402. The road 402 may have a road grade 404. The road grade 404 may be correspond with torque demand. Meaning, for a given road grade 404 the vehicle can determine a torque necessary to maintain its speed via the weight of the vehicle, rolling resistance, etc.

Figure 5:
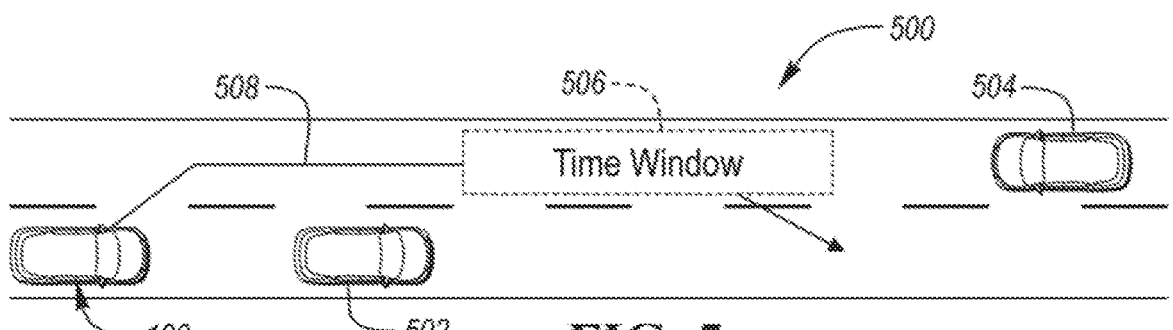
FIG. 5 depicts a vehicle performing a passing maneuver.

Referring to FIG. 5, a passing situation 500 is depicted. The vehicle 100 is shown approaching an upcoming vehicle 502. The vehicle 100 and vehicle 502 may have a vehicle speed difference greater than a predetermined threshold. Meaning, the vehicle 100 may want to pass vehicle 502 if vehicle 502 is going much slower than vehicle 100. The vehicle 100 may further recognize an oncoming vehicle 504 through vehicle-to-vehicle (V2V) or LIDAR communications. The vehicle 100 may determine a passing time window 506 for passing maneuver 508. The passing time window 506 will calculate the distance between the vehicles 100, 502, 504, the speed of the vehicles 100, 502, 504, and the acceleration available to the vehicle 100, or a combination thereof. The time window 506 may further include safety factors to ensure adequate time to pass. The acceleration available to the vehicle 100 may be based on the windings of the vehicle. The controller 140 may calculate whether the passing maneuver can be completed within the time window 506 with the torque of one of the windings versus the torque of the other windings. If the higher torque value is required to ensure the passing maneuver is completed before expiration of the time window, the controller 140 will select the winding with higher torque.

Figure 6:
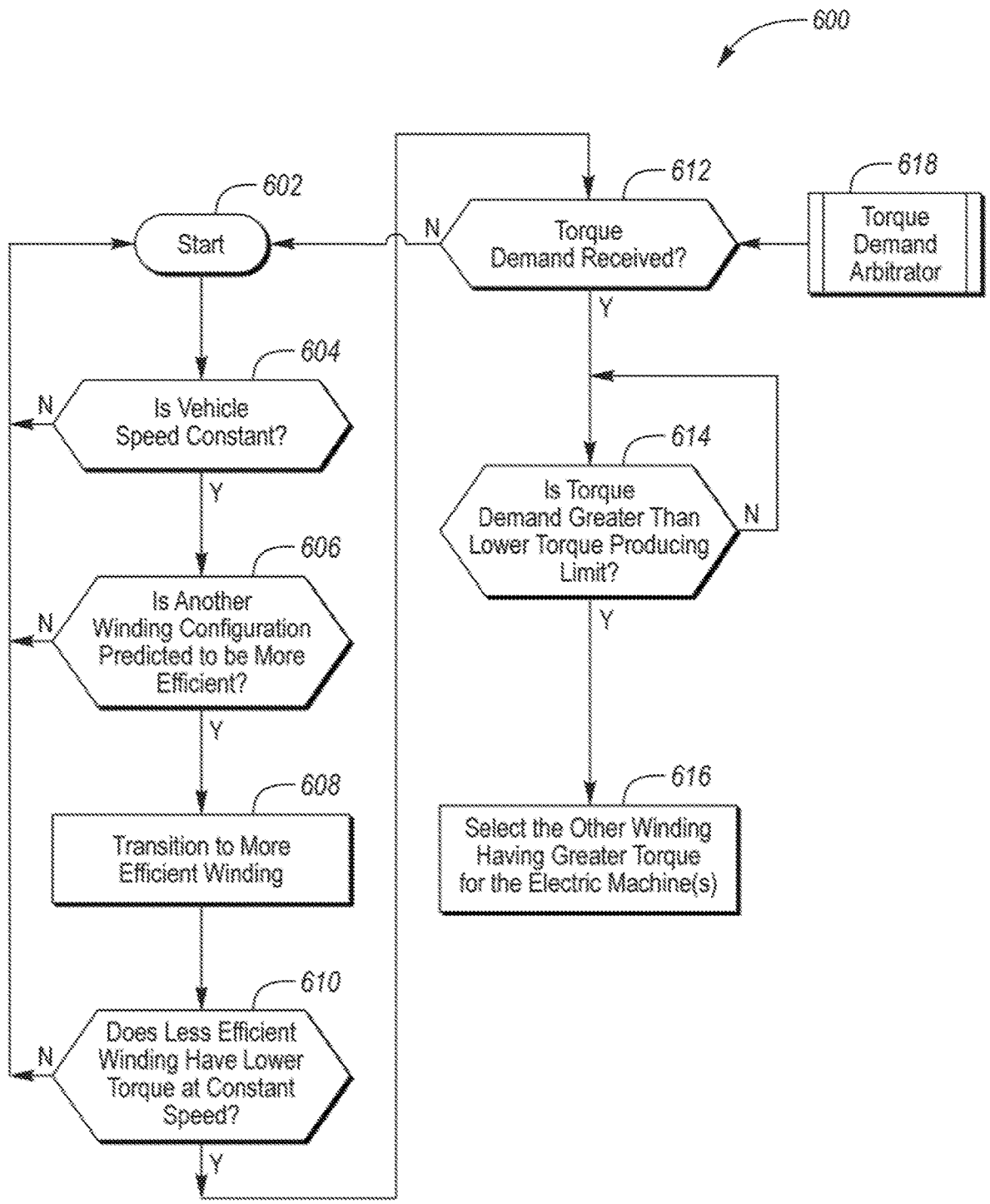
FIG. 6 is an algorithm for selecting an electric machine winding.

Referring to FIG. 6, an algorithm 600 for selecting a winding is shown. Portions of the algorithm 600 may be rearranged or omitted. The algorithm 600 starts in step 602. Although shown with start 602, the algorithm 600 may continuously run. In step 604 the controller 140 determines whether the vehicle speed is constant. If vehicle speed is constant, the controller 140 will determine if a winding other than the current winding is predicted to be more efficient. That is, determine whether the controller 140 should switch from the Wye winding to the Delta winding or vice-versa. In step 608, the controller 140 switches to the more efficient winding at given speed 308. The controller 140 may also switch to the more efficient winding based on other factors in addition to or instead of the given speed 308 (e.g., electric machine losses, inverter losses, eDrive system losses, certain operating points, other vehicle factors, road grade, battery voltage, operating speed region). The electric machine 112 may be at any given speed 308. In step 610, the controller 140 determines whether, the more efficient winding has a lower torque at the current speed. In step 612, the controller 140 receives a torque demand from sub-process 618. If the controller 140 receives a torque demand in step 612, the controller will determine whether the torque demand is greater than the lower torque producing limit 316. If the torque demand is greater in step 614, the controller 140 will select the other winding of the electric machine 112 have greater torque for the given speed 308. The selection may further depend on the source of the torque command provided by algorithm 700 as discussed.

Figure 7A:
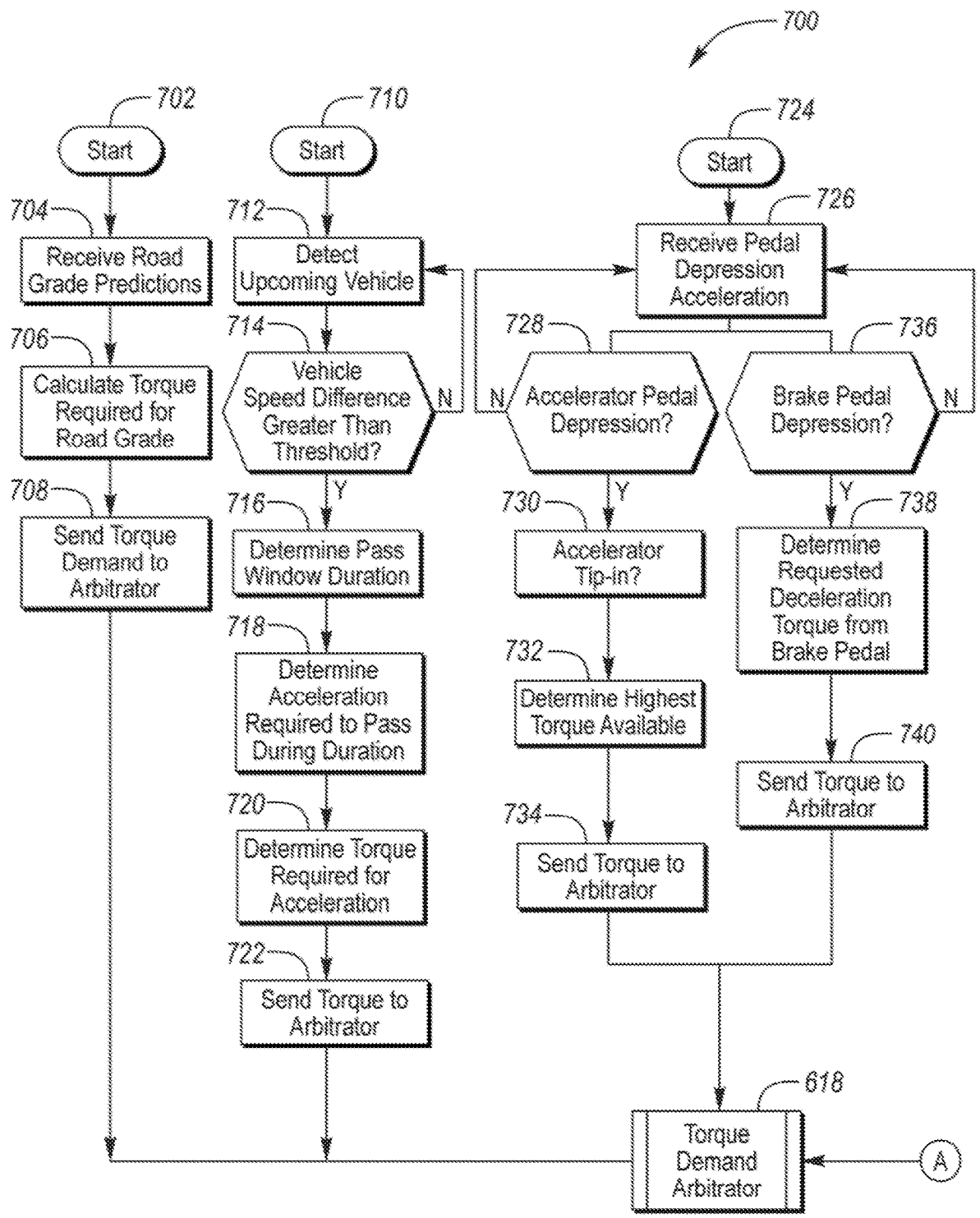
FIG. 7A and FIG. 7B depict an algorithm for determining a torque demand of an electric machine.
Figure 7B:
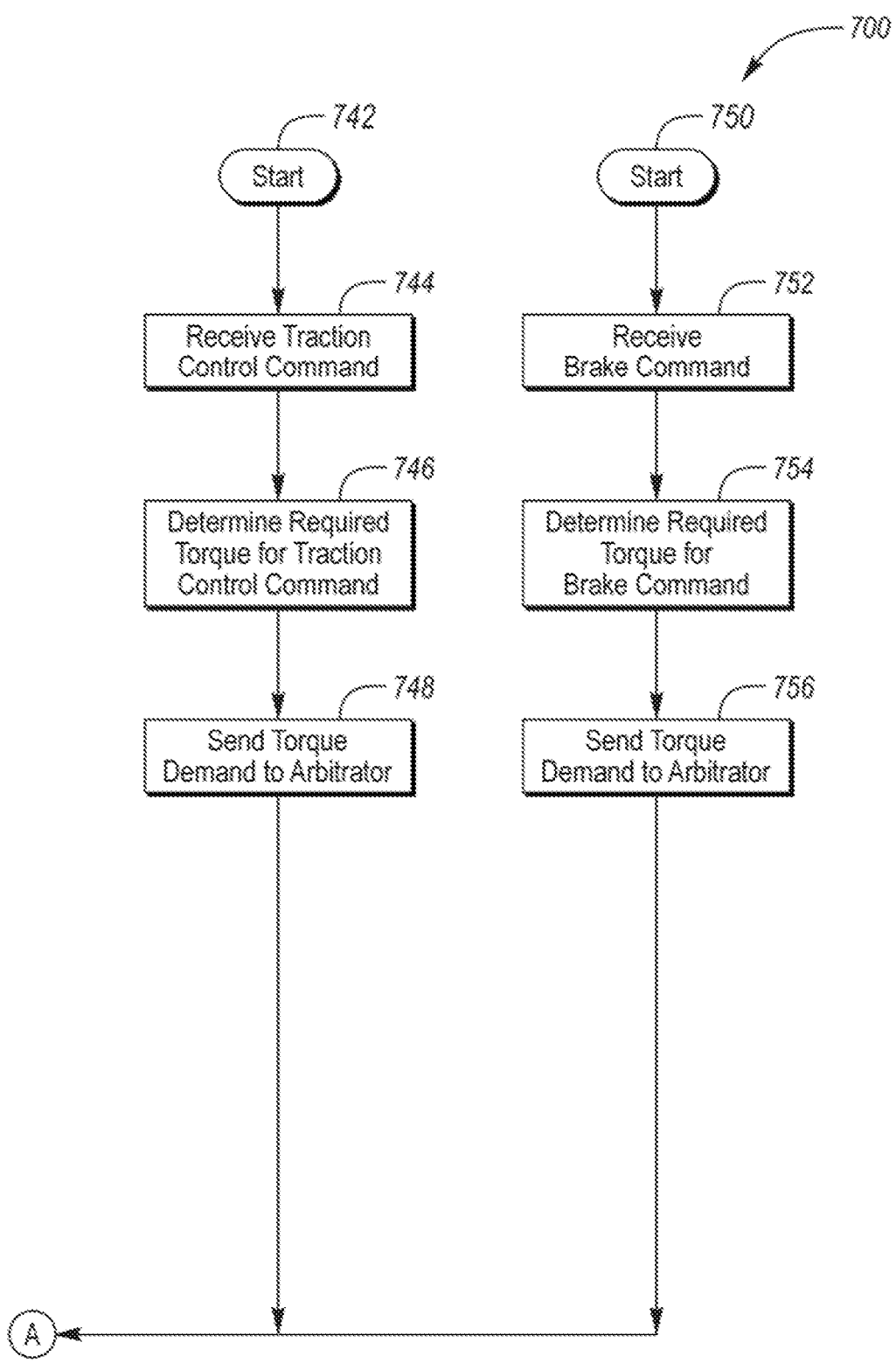

Referring to FIG. 7, an algorithm 700 for determining a torque demand is shown. Although shown with starts 702, 710, 724, 742, 750 the algorithm 700 may constantly run. Portions of the algorithm 700 may be rearranged or omitted. In step 704, the controller 140 receives road grade predictions. The road grade predictions may be received from the offboard server 144 or predicted within the vehicle 100. In step 706, the controller 140 may calculate the torque required to maintain the current speed 308. The controller 140 be programmed with the weight of the vehicle 100 or have sensors to determine the weight of the vehicle 100. Using the weight and road grade, the controller 140 may use physics equations to determine the forces necessary to maintain the vehicle speed 308. The controller 140 may be further configured to provide a torque buffer that is higher than the torque required to maintain the speed to allow for additional torque that may be necessary to pass. Indeed, the controller 140, can—through algorithms 600, 700—determine whether to stay in the winding 114A, 114B, 114C having the lower torque producing limit to ensure efficient operation or select the other of the windings 114A, 114B, 114C to ensure the given speed is maintained.

In step 712, the controller 140 may be configured to detect an upcoming vehicle 502. As stated above, the detection may be from V2V, LIDAR, the server 144, or other means. In step 714, the controller 140 determines whether the given speed of the vehicle 100 is different from the upcoming vehicle 502 above a threshold, requiring the vehicle 100 to pass the upcoming vehicle 502 instead of minimally adjusting speed. If the vehicle speed different is greater than a threshold, the controller 140 will determine the passing time window 506 in step 716. The passing time window 506 may be based on the oncoming vehicle 504, road conditions, and road situations (e.g., curves, non-passing zones). The passing time window 506 ensures adequate time is allotted for the vehicle 100 to conduct passing maneuver 508. The passing time window 506 allows the controller 140 to determine the acceleration required to pass the upcoming vehicle 502. For example, the passing time window 506 may be 120 seconds. In order to pass the upcoming vehicle 502 in the 120 seconds the controller determines the required speed difference between the vehicle 100 and the upcoming vehicle 502. The controller 140 may then determine the acceleration required to reach the speed difference midway through the passing maneuver 508. This acceleration may be associated with a torque value, as determined in step 220 based on vehicle factors (e.g., weight, road grade, wind resistance). In step 722, the torque is sent to the arbitrator.

In step 726, the controller 140 receives a pedal depression acceleration. That is, the acceleration of the pedal 42 as depressed by an operator. Whether the pedal 42 is an accelerator pedal or brake pedal is known by the controller 140. If the pedal 42 is an accelerator pedal in step 728, the controller will determine whether the depression acceleration constitutes a tip-in in step 730. A tip-in is used by the controller 140 to determine whether increased torque is required. The controller 140 is configured to simulate a downshift and simulate how an internal combustion engine would behave in response to a tip-in. The controller 140 would make torque unavailable to the operator for a brief period while selecting the other of the windings 114A, 114B, 114C and then provide the higher torque to the operator after the delay by sending the torque to the arbitrator in step 734. The delay may be similar to an internal combustion delay. The delay may be equal to a duration of the winding change. For example, this performance feel may be instituted when the vehicle is in a sport mode.

If the pedal 42 is a brake pedal in step 736, the controller will determine the requested deceleration torque based on the amount of depression. For example, the operator may be requesting a regenerative brake evolution. The controller 140 will send the torque to the arbitrator in step 740. The controller 140 may determine in algorithm 160 that the requested deceleration torque is not disparate enough from the lower torque producing limit 316 to warrant selecting the other winding 114A, 114B, 114C due to the delay caused by the switch. That is, the controller 140 is configured to balance the amount of torque requested in relation to the lower torque producing limit 316 and if the two torques are disparate enough, the selection of the other winding 114A, 114B, 114C via the switches 126, 128 will be made.

In step 744, a traction control command is received. The traction control command may be received due to the occurrence of wheel slip or the prediction of wheel slip based on road conditions (e.g., ice). The traction control command may include torque requirements to ensure proper wheel torque is available in step 746. The torque requirements may be different for electric machines 112, and as such the controller 140 may independently select the windings for the given electric machines 112.

In step 752, a regenerative brake command is received. The regenerative brake command may be from an autonomous vehicle controller or an operator interface. In step 754, the required torque for the regenerative brake command is determined. In step 756, the command is sent to the arbitrator in step 756. In response to receiving the torque command, the controller 140 may select the other of the windings 114A, 114B, 114C on a front axle 104 of the vehicle 100 such that the electric machine or machines 112 on the front axle 104 have the higher torque producing limit than the rear axle 106 during the regenerative brake evolution.

The torque demand arbitrator 618 receives all of the torque demands requested by the controller 140 along with the surrounding circumstances that caused the torque demand. The arbitrator passes these torque demands to algorithm 600 to operate the vehicle accordingly.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A method for controlling an electrified vehicle including an electric machine having windings selectively configurable in either a delta configuration or a wye configuration, the method comprising, by a vehicle controller:
   receiving road grade predictions from an offboard server;
   calculating a first torque required for the vehicle to maintain current vehicle speed based on the road grade and weight of the vehicle;
   calculating a second torque required to provide acceleration required to pass an upcoming vehicle;

calculating a third torque associated with depression of a vehicle accelerator pedal;

calculating a fourth torque associated with requested deceleration torque associated with depression of a vehicle brake pedal;

calculating a fifth torque associated with traction control responsive to vehicle wheel slip;

calculating a sixth torque associated with regenerative braking; and controlling switches associated with the windings to configure the windings in either the delta configuration or the wye configuration in response to one of the first, second, third, fourth, fifth, and sixth torques selected by a torque arbitrator to produce the selected torque by the electric machine.

* * * * *